(12) United States Patent
Hobden et al.

(10) Patent No.: US 7,503,124 B2
(45) Date of Patent: Mar. 17, 2009

(54) TOOL WITH NON-SLIP FEATURE OR FRICTION ASSEMBLY

(75) Inventors: Robert J. B. Hobden, Ottawa (CA); Gregory Scott Snider, Bel Air, MD (US); Oleksiy P. Sergyeyenko, Brockville (CA)

(73) Assignee: Black & Decker Inc., Towson, MD (US)

( * ) Notice: Subject to any disclaimer, the term of this patent is extended or adjusted under 35 U.S.C. 154(b) by 0 days.

(21) Appl. No.: 11/939,308

(22) Filed: Nov. 13, 2007

(65) Prior Publication Data

US 2008/0142676 A1      Jun. 19, 2008

Related U.S. Application Data

(60) Provisional application No. 60/875,006, filed on Dec. 15, 2006.

(51) Int. Cl.
*B43L 7/00* (2006.01)
(52) U.S. Cl. .......................................... 33/451; 33/484
(58) Field of Classification Search .................. 33/451, 33/448–449, 484–485
See application file for complete search history.

(56) References Cited

U.S. PATENT DOCUMENTS

| | | | | |
|---|---|---|---|---|
| 566,195 | A * | 8/1896 | Leavitt | 33/485 |
| 2,230,010 | A * | 1/1941 | Owens | 33/489 |
| 3,435,533 | A | 4/1969 | Whitfield | |
| 4,035,923 | A | 7/1977 | Florczak | |
| 4,087,917 | A * | 5/1978 | Sheerer | 33/448 |
| 4,944,094 | A | 7/1990 | Depiano et al. | |
| 4,989,332 | A * | 2/1991 | Worrallo | 33/342 |
| 5,172,482 | A * | 12/1992 | Coleman | 33/449 |
| 5,479,717 | A | 1/1996 | von Wedemeyer | |
| 6,131,298 | A | 10/2000 | McKinney et al. | |
| 6,591,511 | B1 * | 7/2003 | Carroll et al. | 33/474 |
| 6,804,894 | B1 * | 10/2004 | Humphries | 33/454 |
| 2005/0034318 | A1 | 2/2005 | Filipesco | |
| 2005/0066533 | A1 | 3/2005 | Wheeler et al. | |
| 2005/0252016 | A1 | 11/2005 | Helda et al. | |

* cited by examiner

*Primary Examiner*—Yaritza Guadalupe-McCall
(74) *Attorney, Agent, or Firm*—Shook, Hardy & Bacon L.L.P.

(57) ABSTRACT

Apparatuses are provided for various tools that incorporate materials with a high coefficient of friction and a low coefficient of friction. The materials with a low coefficient of friction may be mounted on a tool and have a perpendicular movement to the tool. This perpendicular movement may be implemented with a spring mechanism. The materials with a high coefficient of friction may be mounted on the tool in a fixed position. The tool may be pressed against a surface, first engaging the materials with a low coefficient of friction. The tool may freely move across the surface while the materials with a low coefficient of friction maintain contact with the surface. As the tool is continually pressed to the surface, the materials with a high coefficient of friction subsequently make contact with the surface, thereby causing the lateral movement of the tool with respect to the surface to be restricted and stabilized. An example of the tool may be a spirit or carpenter level.

25 Claims, 8 Drawing Sheets

TOOL WITH NON-SLIP FEATURE OR FRICTION ASSEMBLY

CROSS-REFERENCE TO RELATED APPLICATIONS

This application claims the benefit of and priority to commonly owned U.S. Provisional Patent Application Ser. No. 60/875,006, filed Dec. 15, 2006, which is hereby incorporated by reference in its entirety.

STATEMENT REGARDING FEDERALLY SPONSORED RESEARCH OR DEVELOPMENT

Not applicable.

BACKGROUND

Tools and devices are ever-changing to meet the demands of consumers or workers in various environments. The makers of these tools or devices gear their products towards consumers or workers that have become increasingly independent when they carry out a task. For example, manufacturers develop tools or devices to satisfy the demands of the single or independent worker. This can be a person that is in a position to work alone without much assistance. Consequently, this person needs to be able to work without interruption such as the consumer with a single task but without additional help.

One such tool that may prove to be difficult to use without assistance is a spirit or carpenter level. Though the actual level can be used by a single person, the person is generally relegated to using the level to determine if an object is level or plumb or to drawing a line on a surface. If the person needs to mark a level line, this task may prove to be difficult, as the person has to hold the level in one hand and draw the line with the other hand. Oftentimes, if the level is long and weighty, it is almost impossible to have a marking task performed by one person. It is easier to have two persons perform the task. One person holds the level in the preferred position while the other person draws the line at a point where the level and the surface touch. For example, situations may occur where a person holds a long level onto a wall surface. In some instances the person may not be able to achieve the correct position of the level because it must be located high above the person's head and it constantly shifts position. In this case, the level does not stay in position and needs to be repositioned often to the desired alignment. This problem is especially noticed on a vertical or overhead surface making positioning of the level difficult.

Another tool that may be difficult to handle by a single person is a device, or a device that is part of another tool, where movement of the tool is problematic. In these situations, the person may need the tool to remain in a stable position after placement. If the tool shifts position, the person has to re-position it before proceeding onward. Unfortunately, this work manner may be undesirable or a deterrent to accomplishing the task at hand. Such a tool could be a portion of a larger piece of equipment. For example, legs or floor support could be attached to heavy equipment. When the equipment is placed into position on a surface, the equipment may need to remain in the fixed position despite any movement of the surface.

A solution is needed that would allow a tool to be placed against a surface but remain freely movable, and, at a desired time, allow the tool to become fixed in a position and relatively immovable.

SUMMARY

The present invention is defined by the claims below. Embodiments of the present invention solve at least some of the above problems by providing apparatuses for, among other things, a tool, a carpenter level, or a straight-edge device.

In one embodiment of the present invention, a spirit or carpenter level includes a frame, at least one bubble vial for leveling, and at least one assembly having a first material with a high coefficient of friction and a second material having a low coefficient of friction. In another embodiment, the level includes two assemblies that are preferably located in proximity to the terminal ends of the frame; however, additional assemblies may be located throughout the length of the level in order to accommodate longer level lengths or to better position the assemblies to provide their function. Alternatively, in shorter levels, it may be preferable to utilize a single assembly rather than multiple ones.

In yet another embodiment, a tool is provided that comprises an elongated body having foot assemblies located on one side. Each of the foot assemblies has a high friction foot and a low friction foot. The high friction foot is located in a fixed position extending perpendicular to the elongated body. The low friction foot is located in a position adjustably extending perpendicular to the elongated body and extending past the high friction foot from the elongated body when in a resting position.

In still another embodiment, a straight-edge device used for leveling includes an elongated frame with materials having a high coefficient of friction and materials having a low coefficient of friction. The materials with a low coefficient of friction are connected to a planar side of the elongated frame, extend generally perpendicularly therefrom, and are adapted to move along a perpendicular axis with the elongated frame. The materials with a high coefficient of friction connect to the planar side of the elongated frame in a fixed position and extend generally perpendicularly from the elongated frame but remain below the materials with a low coefficient of friction when all of the materials are in a resting position. The elongated frame is positioned such that the materials with a low coefficient of friction touch a surface and retract along the perpendicular axis when the elongated frame is pressed towards the surface. The low coefficient of friction allows the elongated frame to move across the surface when only the low friction materials touch the surface. The materials with a high coefficient of friction subsequently come in contact with the surface as the elongated frame is pressed towards the surface. The high friction materials restrict movement of the elongated frame across the surface when they touch the surface.

BRIEF DESCRIPTION OF THE SEVERAL VIEWS OF THE DRAWINGS

Illustrative embodiments of the present invention are described in detail below with reference to the attached drawing figures, which are incorporated by reference herein and wherein.

DETAILED DESCRIPTION

Various embodiments of the present invention provide apparatuses that can be used with a tool, a carpenter level, a straight-edge device, etc. Certain embodiments of the present invention, when implemented, provide for a tool that may freely slide on a surface in a non-marring manner. When needed, however, the amount of friction between the tool and the surface can be increased, thereby making it easy to keep the tool stationary on the surface. In a typical embodiment, this tool may be a level; however, it should be noted that the present invention is not limited to incorporation into such a tool. Another exemplary embodiment may be a device or a portion of a device that contains both a low-friction and a high-friction component to allow for the different interactions between the tool and the surface. The surface may be any wall, floor, or other planar material.

Figure 1:
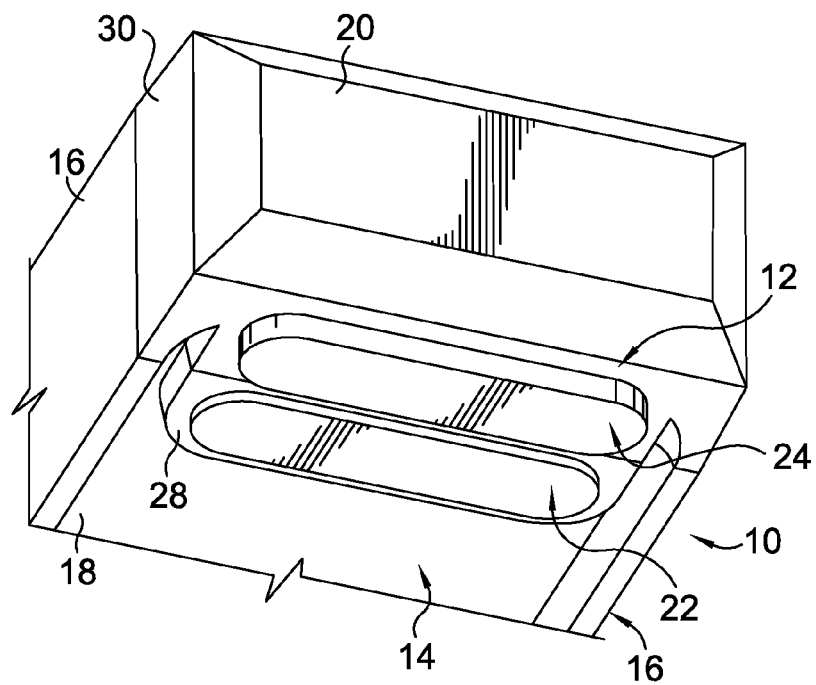
FIG. 1 is a fragmentary perspective view of a level having an embodiment of the present invention incorporated therein.
Figure 2:
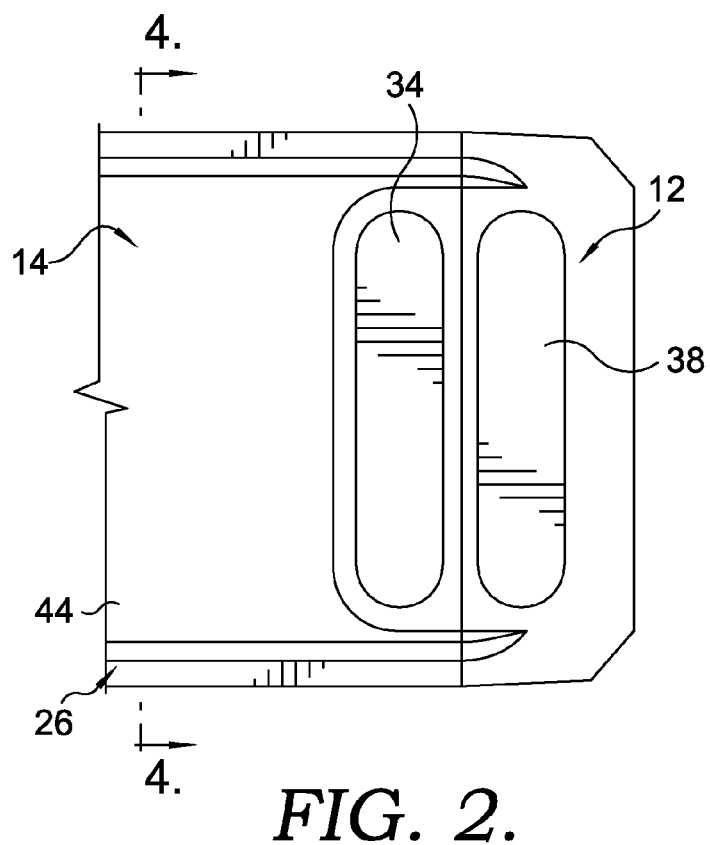
FIG. 2 is a plan view of the level of FIG. 1.

In an implementation of an embodiment of the present invention, FIG. 1 illustrates an end of a level 10 having an assembly 12 located therein. The level 10 includes a frame 14 having a pair of longitudinally extending, parallel planar edges 16. The edges 16 are spaced apart by a body 18. The frame 14 includes an end cap 20, into which the assembly 12 has been incorporated. It should be noted that the assembly 12 does not need to be in the end cap 20, but can be directly incorporated into to level 10 or subsequently added thereon. The assembly 12 includes a first material 22 and a second material 24. As illustrated in FIG. 2, the first material 22 and the second material 24 are preferably adjacent to each other. In other embodiments, the materials 22 and 24 may be spaced apart from one another greater differences or may be directly adjacent one another. Also, shown in FIG. 2 is a side 26 of frame 14.

Figure 3:
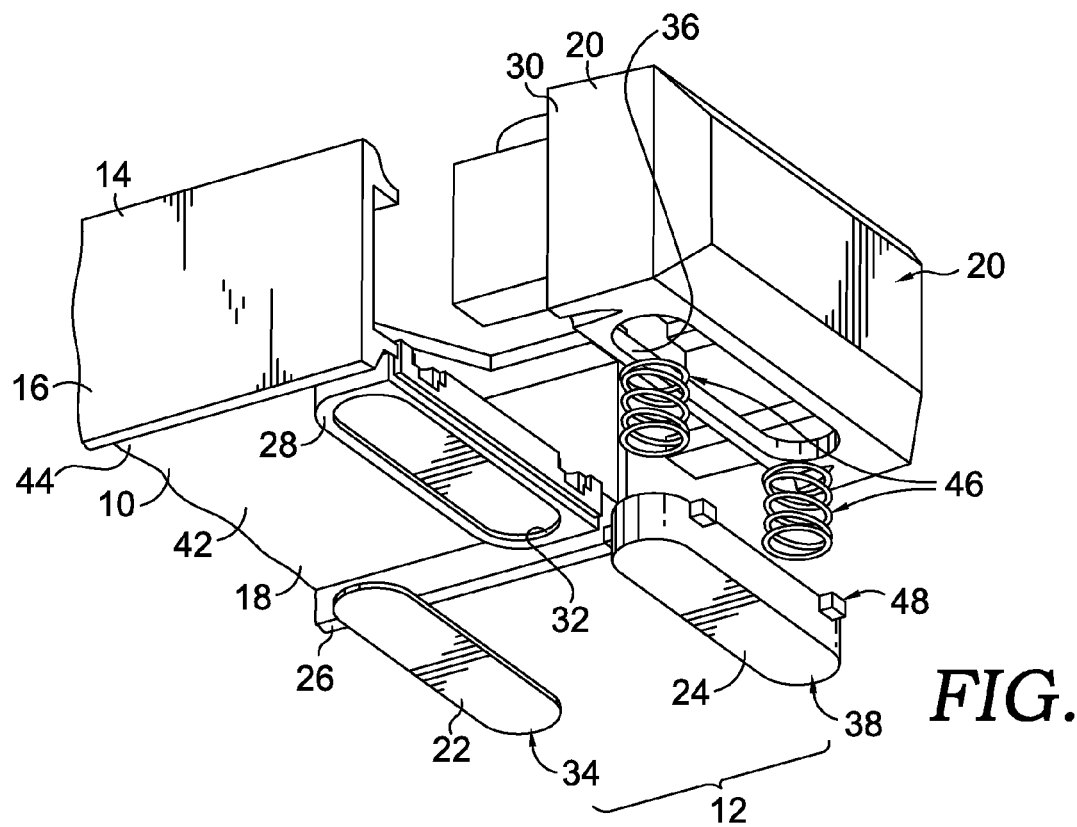
FIG. 3 is a fragmentary exploded perspective view of the level of FIG. 1.

FIG. 3 illustrates an exploded perspective view of an end of the level 10 and the assembly 12. The description of the assembly 12 is best understood when viewing FIGS. 1-4. In the embodiment of the present invention illustrated, the level 10 includes at least one bubble vial (not shown) that is known to those skilled in the art. The vial is positioned in the frame 14, so that when one of the edges 16 of the level 10 is positioned at the predetermined angle (e.g., horizontal, vertical, at forty-five degrees with respect to a datum direction), its bubble is positioned in the middle of the vial, thereby providing a visual indication of the level's orientation.

The end cap 20 includes an inner portion 28 and an outer portion 30. The inner portion 28 has a first recess 32 that receives a first insert 34 and the outer portion 30 has a second recess 36 that receives a second insert 38. The first recess 32 holds the first insert 34 in a fixed position. The first insert 32 is preferably a form of the first material 22 and has a high coefficient of friction as a characteristic thereof, such as a high-friction pad or a high-friction foot. The first insert 34, and in turn the first material 22, may be, for example, made of rubber. The high coefficient of friction enables the first insert 34 to resist lateral movement when the first insert 34 comes into contact with the surface. For example, if the first insert 34 is placed against a surface, sideways movement of the first insert 34 along the surface should be difficult unless a large lateral force is applied.

Although the first insert 34 is illustrated in an oblong shape, the first insert 34 can be implemented in other shapes, including a square, circle, or rectangle. Furthermore, in another embodiment, the first insert 34 may be attached to the first recess 32 in such as a way as to allow the first insert 34 to rotate about an axis while remaining in the first recess 32. In another embodiment, one of the inserts is circular while the other insert forms a ring around the circle.

The inner portion 28 of the end cap 20 is secured within the frame 14 of the level 10 by any means known to those skilled in the art, e.g., tongue and groove. As shown in the figures, the inner portion 28 may be received in a notch in the frame 14. However, other embodiments may be implemented with a different connection or no connection at all. An embodiment of the present invention may be implemented where the frame 14 is constructed with the inner portion 28 being integrated in the frame 14 as a unity piece during the manufacturing process, thereby having only one piece of material as opposed to having two or more pieces of materials that have been joined together.

The end cap 20 is used to enclose the inner portion 28 within the frame 14 of the level 10, as well as to house the second insert 38. The second material 24, and in turn the second insert 38, is preferably a material having a low coefficient of friction, thereby allowing the second material 24 to slide along most surfaces with ease. The second insert 38 may be a low-friction pad or a low-friction foot. The second insert 38, and in turn the second material 24, may be, for example, made of plastic or metal. In this arrangement, the second insert 38 is movable in a direction substantially perpendicular to a surface 42 of a side wall 44 of the level 10 that extends between the edges 16. The second insert 38 is typically biased outwardly from the end cap 30. While this can be accomplished by a number of methods known to those skilled in the art, one particular method includes using springs 46. The springs 46 bias the second insert 38 away from the end cap 20. The second recess 36, as seen in FIG. 3, may be an opening through a wall of the outer portion 30 of the end cap 20.

Figure 4:
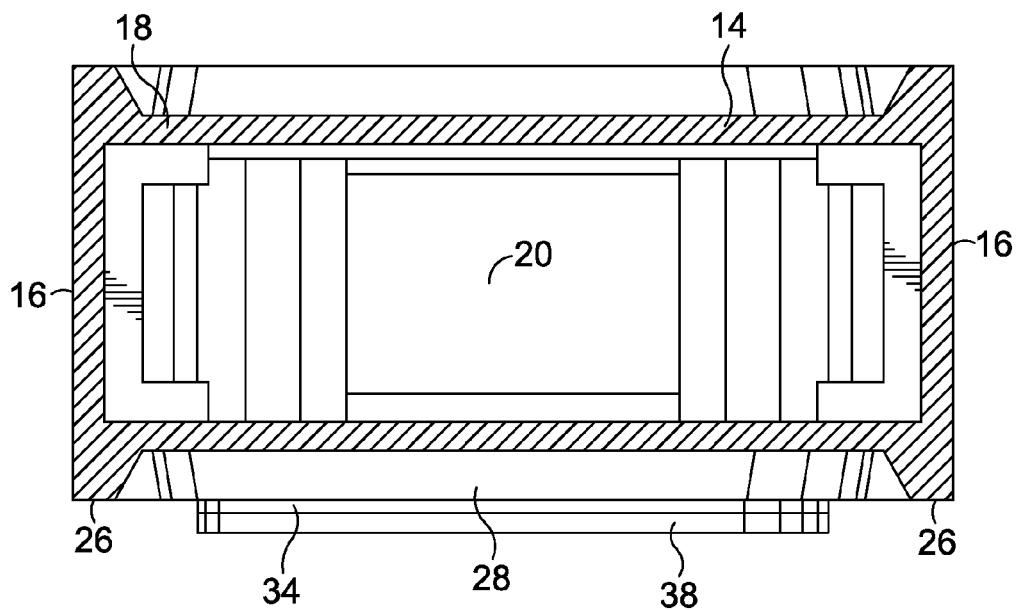
FIG. 4 is a cross-sectional view of the level of FIG. 1 taken along the line 4-4 of FIG. 2.

In FIG. 4, a cross-sectional view is shown taken along line 4-4 of FIG. 2. FIG. 4 illustrates level 10 and assembly 12 in their resting state without any application to a surface or other structure. The second insert 38 protrudes downwardly below the sides 26 of the edges 16 and below the first insert 34. As the sides 26 of the level 10 are moved toward a surface, the second insert 38 is the first to engage the surface. When only the second insert 38 engages the surface, only a small amount of effort is needed to slide the level 10 along the surface (i.e., the low friction properties of the second material 24 of the second insert 38 facilitate easy movement along the surface).

Once a user determines a desired location of the level 10 along the surface, additional pressure or force is applied to the level 10 toward the surface. This force overcomes the bias of the springs 46 and moves the second insert 38 back into the second recess 36 of the end cap 20. As the second insert 38 moves into the end cap 20, the first insert 34 moves toward and engages the surface. The high coefficient of friction exhibited by the first material 22 of the first insert 34 restricts the ability of the level 10 to slide or move along the surface. The user may then use the level (e.g. to mark a line on the surface) without concern that the level 10 will move during use.

Figure 5A:
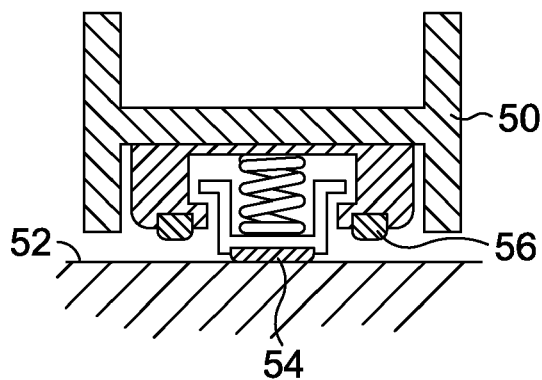
FIGS. 5A-C illustrate various stages of an alternate embodiment of an assembly implemented in accordance with an embodiment of the present invention.
Figure 5B:
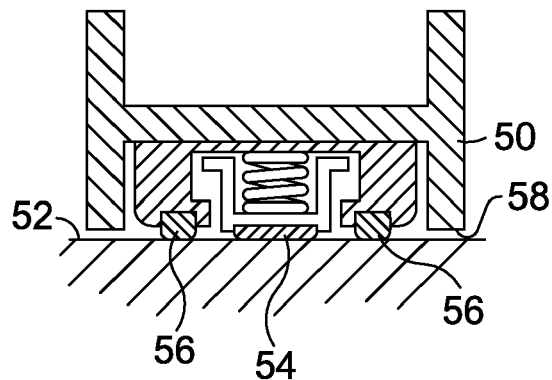
Figure 5C:
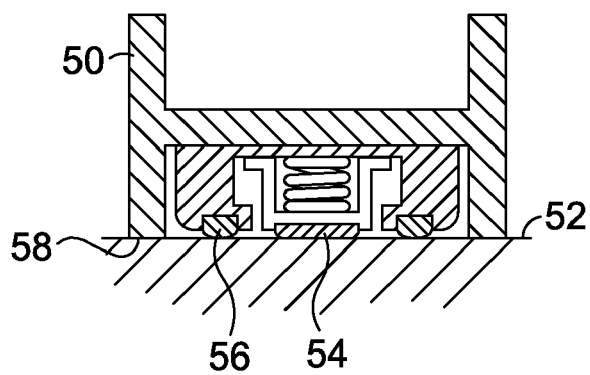

FIGS. 5A-C illustrate an alternative embodiment of the assembly. As illustrated in FIG. 5A, when a level 50 is placed gently against a surface 52, the level 50 slides smoothly on the extended low-friction feet 54. When the level 50 is forced downwardly toward the surface 52, the low-friction feet 54 retract and allow the high-friction feet 56 to contact the surface, as illustrated in FIG. 5B. As the force with which the level 50 is held against the surface increases, the high-friction feet 56 compress and allow the sides 58 of the level 50 to contact the surface 52 in a highly stable manner, as illustrated in FIG. 5C.

As discussed earlier, high-friction feet may be mounted so that they swivel about their center. The high-friction feet 56, like the first insert 34, may be a rounded or circular shape to facilitate the swivel feature. For a level with an assembly at each end, the swivel mechanism allows one end of the level to be locked in place and allows the level to pivot around this end.

With respect to the interaction of the low-friction material and foot, various types of return springs may be used to allow their compression to occur at varying levels of force. If normal coil springs are used, the force required by the operator to compress the low-friction feet will increase linearly with distance as the level is pushed toward a surface such as a wall. In contrast, a buckling spring or an over-center spring, may be used so that an initially large force is required to compress the sliding feet, but once they are compressed, relatively little force is required to maintain compression and hold the level against the surface.

Alternatively, the high-friction material and the low-friction material may be located within a single foot or cap. The cap can be located anywhere along the frame of the level. For example, the high and low-friction materials may be self-contained within a pod that is capable of being attached to an existing level in order to provide the non-slip feature.

FIGS. 6-10 illustrate alternate embodiments of the present invention. In these embodiments, the present invention takes the form of a low friction pad 60 and a high friction pad 62. The low friction pad 60 eliminates the necessity of a mechanical device capable of moving toward and away from the side 26 of the level 10. The low friction pad may be comprised of any compressible material, such as a foam, fabric, sponge, hook or loop material or other compressible item. In the embodiment illustrated in FIGS. 6-10, the low friction pad 60 is comprised of plastic fibers 64 sufficiently spaced apart to permit collapsing thereof upon application of a force to the level 10. These fibers 64 can be of the type found in a hook and loop fastener system.

Figure 7:
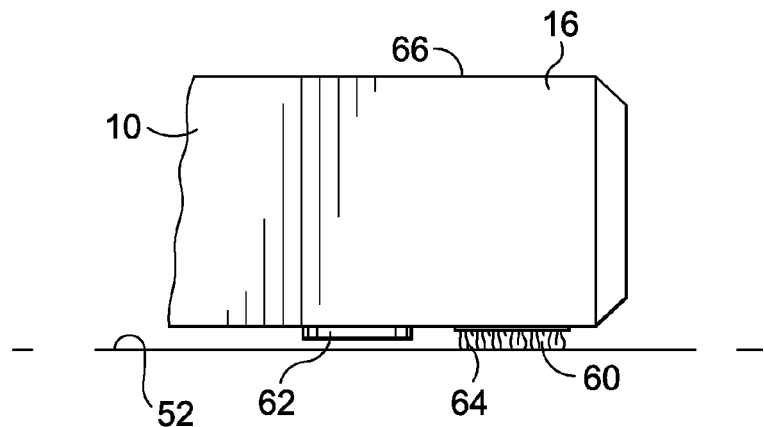
FIG. 7 is a fragmentary side view of the level of FIG. 6 in a sliding position with a low friction material engaging a surface.
Figure 8:
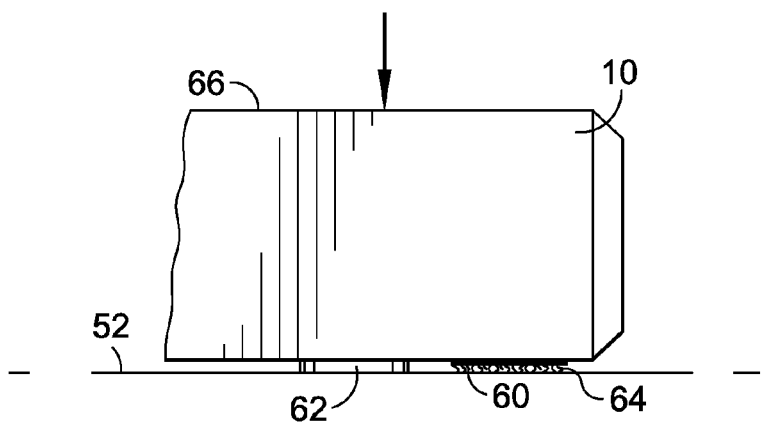
FIG. 8 is the level of FIG. 7 in a non-sliding position with the low friction material collapsed and a high friction material engaging the surface.

The plastic fibers 64 provide a low friction pad 60 with a relatively low co-efficient of friction to permit the level 10 to slide along a surface. The fibers 64 are sufficiently rigid to support the weight of the level 10 without being collapsed, as illustrated in FIG. 7, but are sufficiently flexible such that a downward force on an upper surface will collapse the fibers 64 and permit the high friction pad 62 to come into contact with the surface 52, as illustrated in FIG. 8. Once the high friction pad 62 is brought into contact with the surface 52, lateral movement of the level 10 along the surface 52 is restricted, thereby permitting the user to utilize the level 10 without fear of inadvertent movement thereof.

Distal ends 65 of the plastic fibers 64 cooperate to form a first surface engaging plane. The first surface engaging plane, which is present both on a low friction pad 60 of any compressible material and on the low friction components of the previously discussed embodiments, engages the desired work surface and is movable (either by compression of the compressible material that forms the low friction pad, such as in this embodiment, or by movement of low friction material) from a first position, where an adjacent high friction component does not engage the work surface, to a second position, where a second surface engaging plane of the high friction component engages the work surface.

Figure 6:
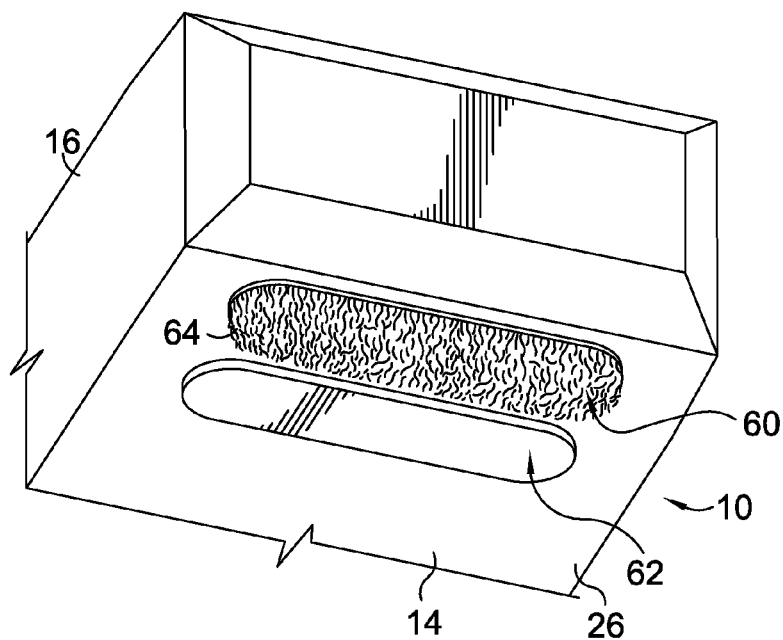
FIG. 6 is a fragmentary perspective view of a level having an alternate embodiment of the present invention incorporated therein.
Figure 9:
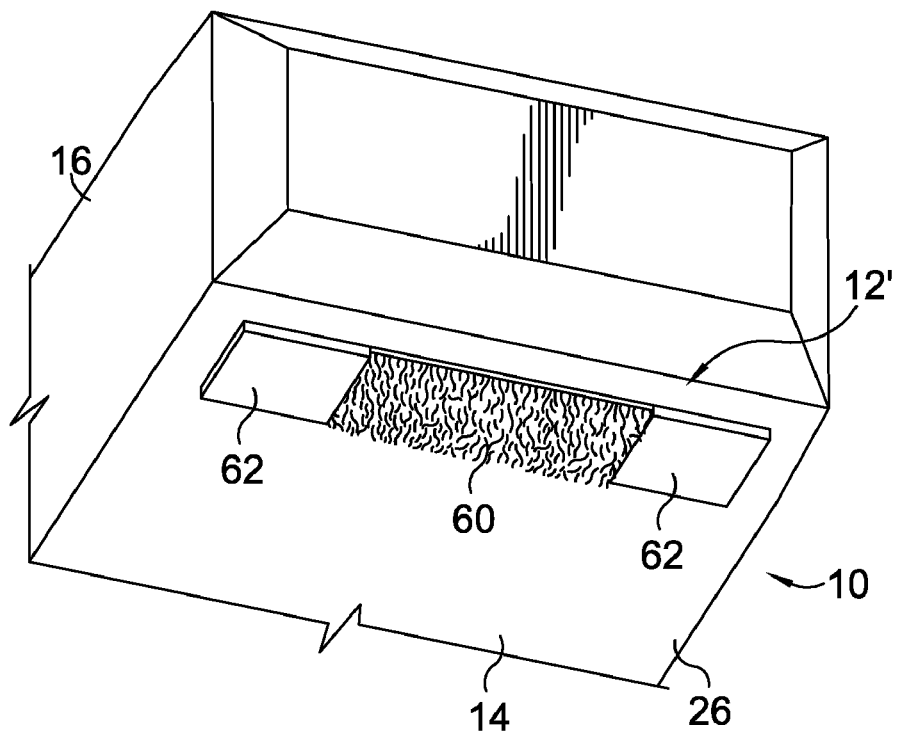
FIG. 9 is a fragmentary perspective view of a level having yet another alternate embodiment of the present invention incorporated therein.
Figure 10:
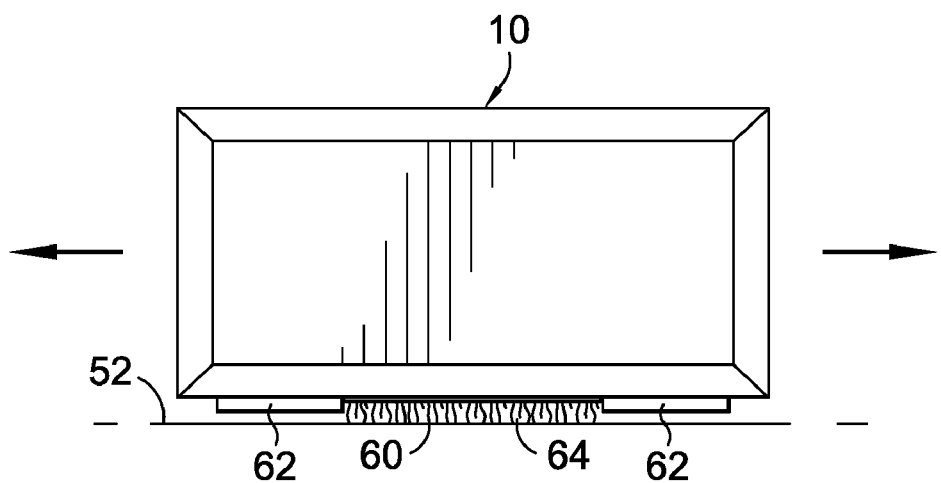
FIG. 10 is an end view of the level of FIG. 9 in a sliding position with a low friction material engaging a surface.
Figure 11:
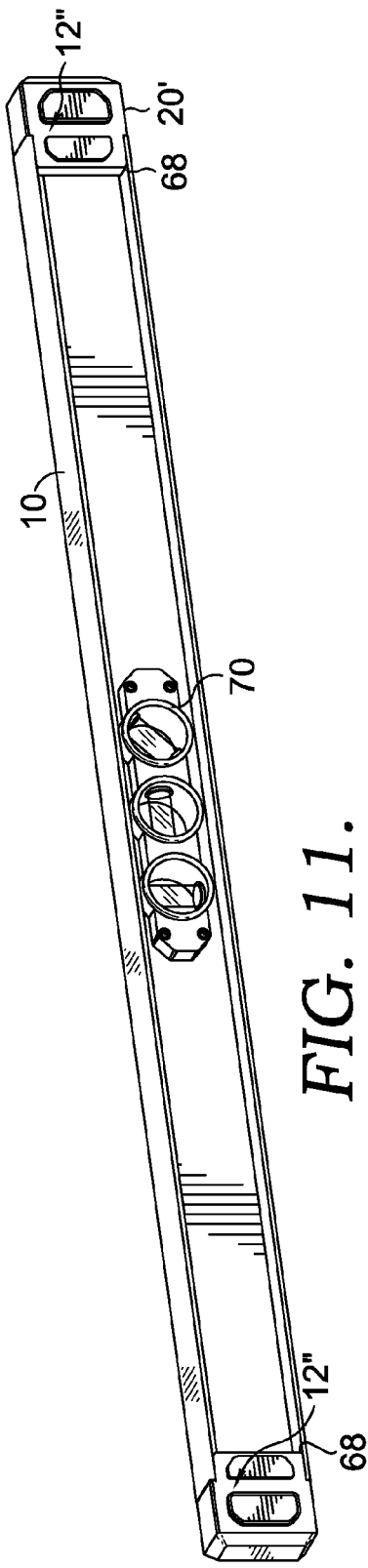
FIG. 11 is a front perspective view of a level having two non-slip assemblies constructed in accordance with an embodiment of the present invention incorporated therein.
Figure 12:
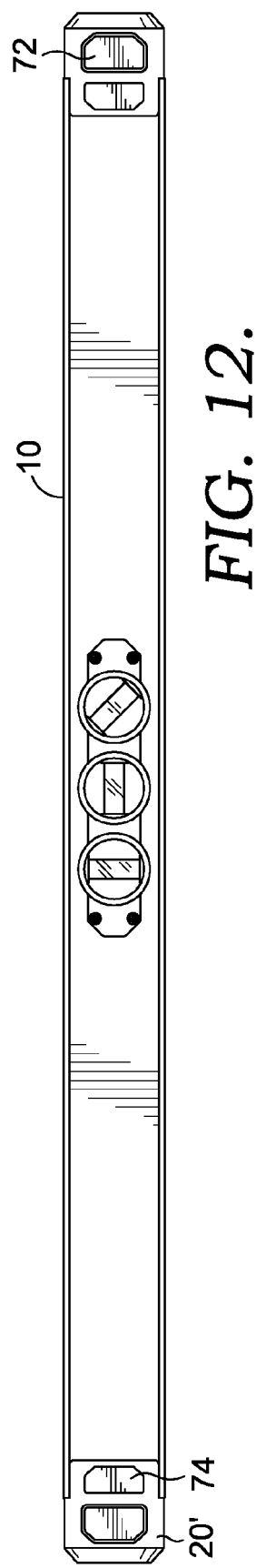
FIG. 12 is font side elevation view of the level of FIG. 11.
Figure 13:
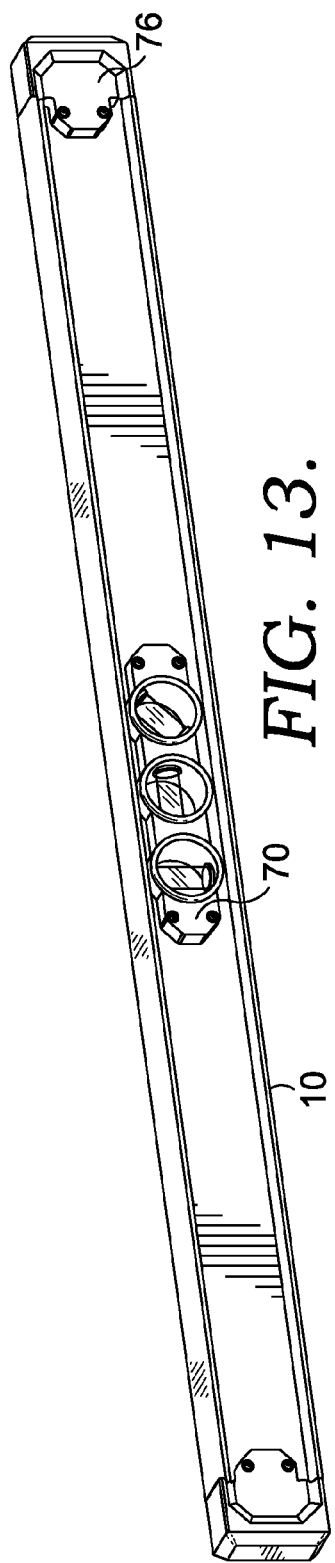
FIG. 13 is a rear perspective view of the level of FIG. 11.
Figure 14:
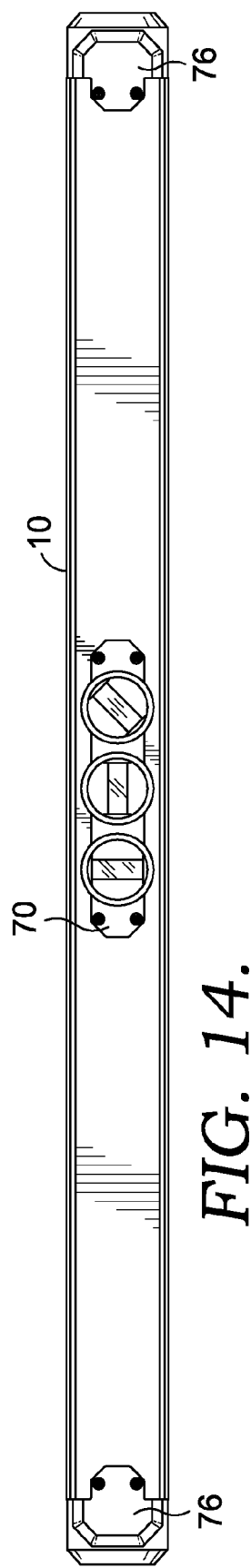
FIG. 14 is a rear side elevation view of the level of FIG. 11.
Figure 15:
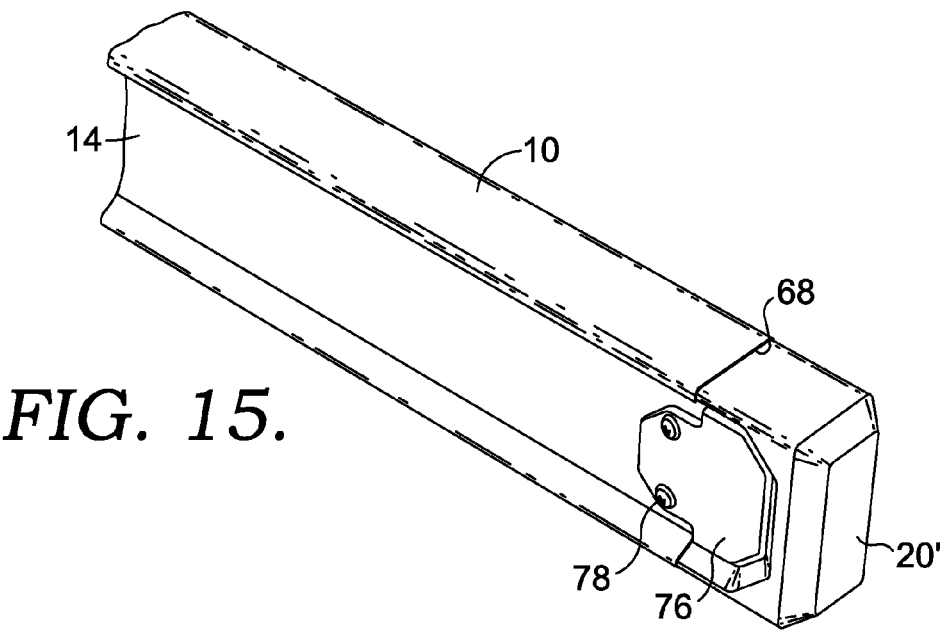
FIG. 15 is a fragmentary rear perspective view of an end of the level of FIG. 11.
Figure 16:
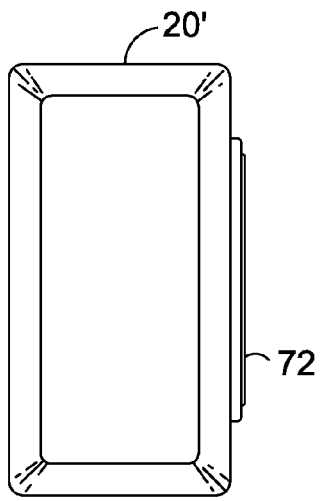
FIG. 16 is an end view of the end of the level of FIG. 15.
Figure 17:
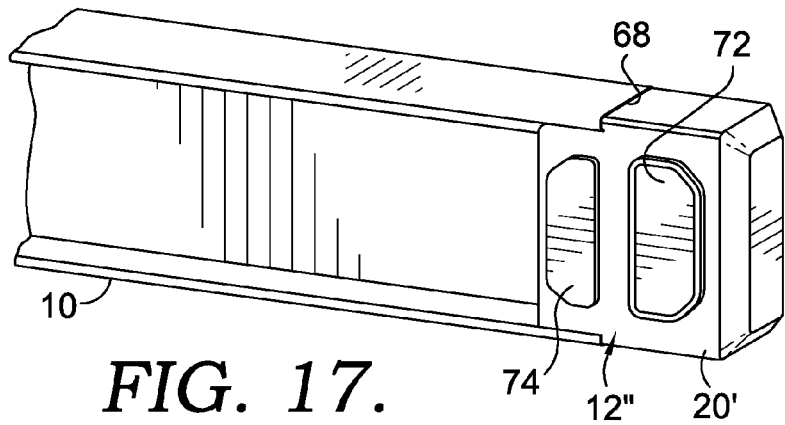
FIG. 17 is a fragmentary front perspective view of the end of the level of FIG. 15.

FIGS. 9 and 10 illustrate an alternate arrangement of the embodiment disclosed in FIGS. 6-8. In this arrangement, the low friction pad 60 is positioned intermediate two high friction pads 62. This arrangement operates on a similar principal to that disclosed in connection with the previous embodiments where the low friction pad 62 supports the level 10 with respect to a surface 52 to permit a level 10 to be easily moved there along, as illustrated in FIG. 10. Subsequent movement of the level 10 towards the surface 52 compresses the low friction pad 60 to a point where the high friction pads 62 engage the surface 52 and operate to retard lateral movement of the level 10 along the surface 52. The pads 60, 62 of FIGS. 6-8, as well as the combined assembly 12' of FIGS. 9 and 10, can be provided to an existing item as a retro fit by way of adhering the pads 60, 62 or assembly 12' to the desired tool (e.g., level 10).

FIGS. 11-17 illustrated one possible implementation of an embodiment of the present invention. In the illustrated implementation, the level 10 is provided with two selective non-slip assemblies 12", one on each end. The assemblies 12" are provided in two end caps 20' on opposite ends 68 of the level. The level 10 includes a bubble vial assembly 70 coupled with the frame 14 intermediate the ends 68.

Each assembly 12" includes a low friction pad 72 and a high friction pad 74. As with previous embodiments of the invention discussed above, the low friction pad 72 is biased away from a side of the end cap 20' but is movable toward the side of the end cap 20' by a force sufficient to overcome the outward bias placed on the low friction pad 72. In this embodiment, springs (not shown) are positioned within the end cap 20' to bias the low friction pads 72 outwardly. Once the force of the springs is overcome, the low friction pad 72 is moved into the end cap 20' until the high friction pad 74 engages the work surface. In this embodiment, an access panel 76 is provided on each end cap 20' opposite the side with the pads 72, 74 to provide access to an interior of the end cap 20' where the springs are located to assist with manufacturing the assembly 12". Screws 78 can be used both to secure the access panel 76 to the end cap 20' and to secure the end cap 20' to the frame 14 of the level 10.

As depicted in FIGS. 1-17, exemplary embodiments of the present invention have been described in connection with a level. However, the present invention is not limited to such use. Other embodiments may be implemented that create a tool or a portion of a device with high-friction and low-friction components. Tools may be manufactured that implement the high-friction and low-friction features. For example, a saw may incorporate a straight edge or an elongated frame such that when only the low-friction component is touching the surface the blade of the saw is retracted. When a user has the saw in the desired position, the saw may be pressed against the surface, thereby engaging the high-friction component. Simultaneously, the high-friction component stabilizes the saw while the blade of the saw appears and cuts the material.

In another embodiment, devices incorporating the present inserts may be used as part of other equipment, for example, as legs or floor support. One can envision a heavy piece of equipment that is mounted on a device or connected to the device. The heavy equipment may be moved around on a surface through the contact of the low-friction feet with the surface. At a point where the heavy equipment is moved into a desired position, the heavy equipment may be pressed towards the surface allowing the high-friction feet to make contact with the surface. At this point, the high-friction feet restrict movement of the heavy equipment. This embodiment is useful for equipment that is loaded on a movable vehicle such as a truck, train, or airplane. The device allows the equipment to be moved and subsequently locked into a desired place. Furthermore, a locking mechanism may be implemented that keeps the device in the locked position so that a spring mechanism or other component does not remove the contact between the high-friction feet and the surface.

While the present invention has been described in detail and with reference to specific embodiments thereof, it will be apparent to one skilled in the art that various changes and modifications can be made therein without departing from the spirit and scope thereof. For example, it is to be understood that terms such as "top", "bottom", "front", "rear", "side", "height", "length", "width", "upper", "lower", "interior", "exterior", "inner", "outer" and the like as may be used herein, merely describe points of reference and do not limit the present invention to any particular orientation or configuration.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and sub-combinations are of utility and may be employed without reference to other features and sub-combinations and are contemplated within the scope of the claims. Not all steps listed in the various figures need be carried out in the specific order described.

The invention claimed is:

1. A tool, comprising:
   an elongated body having a foot assembly located on a side of the body;
   wherein the foot assembly includes a high friction foot and a low friction foot;
   wherein the high friction foot is located in a fixed position on and extends perpendicular to the elongated body; and
   wherein the low friction foot is movably coupled with the elongated body and extends generally outwardly therefrom such that a portion thereof extends beyond the high friction foot when the foot assembly is in a resting position.

2. The tool of claim 1, wherein the low friction foot is movable along a path that is generally perpendicular to a longitudinal axis of the elongated body.

3. The tool of claim 2, wherein the low friction foot has a surface with a lower coefficient of friction than a surface of the high friction foot and wherein the tool is positionable adjacent a surface such that only the low friction foot makes contact with the surface.

4. The tool of claim 3, wherein the low friction foot permits movement of the tool with respect to the surface when the low friction foot is in contact with the surface.

5. The tool of claim 2, wherein movement of the elongated body towards the surface moves an outer surface of the low friction foot toward the body until both the low friction foot and the high friction foot make contact with the surface.

6. The tool of claim 5, wherein when the elongated body is pressed against the surface, the high friction foot makes contact with the surface and causes the elongated body to resist sliding along the surface.

7. The tool of claim 6, further comprising a second foot assembly located on a second side of the elongated body.

8. The tool of claim 6, wherein the high friction foot located in the fixed position may swivel about an axis, thereby permitting the elongated body to pivot about the axis.

9. The tool of claim 6, wherein the low friction foot is biased outwardly from the elongated body.

10. The tool of claim 9, wherein the friction foot is biased outwardly by a spring selected from a group including a coil spring, a buckling spring, and an over-center spring.

11. A straight-edge device used for leveling, comprising:
    an elongated frame having one or more locations with first materials with a high coefficient of friction and one or more second locations with second materials with a low coefficient of friction;
    wherein the one or more second materials extend outwardly from a planar side of the elongated frame and are movable toward and away from the elongated frame;
    wherein the one or more first materials are connected to the planar side of the elongated frame in a fixed position and extend outwardly from the elongated frame an amount less than the one or more second materials when both the one or more first materials and the one or more second materials are in a resting position; and
    wherein the one or more second materials retract toward the elongated frame when the elongated frame is positioned adjacent and moved toward a surface, wherein the low coefficient of friction allows the second material to move along the surface when the second material touches the surface, wherein one or more first materials subsequently come in contact with the surface when the one or more second materials are sufficiently retracted as the elongated frame is pressed towards the surface, and wherein the high coefficient of friction of the first material restricts movement of the first material, and in turn the elongated frame, along the surface when the one or more first materials touch the surface.

12. The device of claim 11, wherein the one or more second materials are biased away from the elongated frame.

13. The device of claim 12, wherein the one or more second materials are biased by a spring mechanism selected from a group including a coil spring, a buckling spring, and an over-center spring.

14. The device of claim 12, wherein the one or more first materials and the one or more second materials are located in proximity to each other on the elongated frame.

15. The device of claim 14, wherein a first one of the one or more first materials and a second one of the one or more second materials are located adjacent an end of the elongated frame.

16. The device of claim 14, wherein the first material is made of rubber and the second material is made of plastic, metal or wood.

17. A spirit level, comprising:
an elongated frame;
at least one bubble vial coupled with the frame for indicating the orientation of the level; and
at least one friction assembly having a first material with a high coefficient of friction and a second material with a low coefficient of friction, wherein the second material is movable to selectively permit engagement of the first material.

18. The level of claim 17, wherein the at least one assembly is located in proximity to a terminal end of the frame.

19. The level of claim 17, wherein the at least one assembly is located at a center of the frame.

20. The level of claim 17, wherein a plurality of the assemblies are located intermittently across the frame.

21. A variable friction assembly comprising:
a first low friction material having a first surface engaging plane; and
a first high friction material having a second surface engaging plane;
wherein the first surface engaging plane is movable from a first position to a second position, wherein the first surface engaging plane is not co-planar with the second surface engaging plane in the first position, and wherein the first surface engaging plane is co-planar with the second surface engaging plane in the second position.

22. The assembly of claim 21, wherein the first low friction material is a compressible material having a relatively low coefficient of friction.

23. The assembly of claim 22, wherein the first low friction material is selected from a group including foam, fabric, sponge, plastic fibers, hook material and loop material.

24. The assembly of claim 21, wherein the first low friction material is a generally non-compressible material having a relatively low coefficient of friction.

25. The assembly of claim 24, wherein the first low friction material is selected from a group including plastic, metal and wood.

* * * * *